(12) United States Patent
Kubek

(10) Patent No.: US 9,389,406 B2
(45) Date of Patent: Jul. 12, 2016

(54) CHANGING APPARATUS FOR A MICROSCOPE

(75) Inventor: Martin Kubek, Driedorf (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 859 days.

(21) Appl. No.: 13/552,427

(22) Filed: Jul. 18, 2012

(65) Prior Publication Data

US 2013/0021665 A1 Jan. 24, 2013

(30) Foreign Application Priority Data

Jul. 19, 2011 (DE) .......................... 10 2011 051 949

(51) Int. Cl.
*G02B 7/182* (2006.01)
*G02B 21/24* (2006.01)
*G02B 7/00* (2006.01)
*G02B 7/16* (2006.01)

(52) U.S. Cl.
CPC .............. *G02B 21/248* (2013.01); *G02B 7/006* (2013.01); *G02B 7/16* (2013.01)

(58) Field of Classification Search
CPC ........ G02B 5/201; G02B 26/008; G02B 5/20; G02B 21/26; G02B 5/22; G02B 21/02; G02B 7/006; G02B 21/362; G02B 5/23; G02B 21/0044; G02B 21/0076; G02B 21/248; G02B 21/24; G02B 23/2461; G02B 23/2476; G02B 26/023; G02B 3/0006; G02B 5/005; G02B 6/3636; G02B 6/3652; G02B 7/00; G02B 5/205; G02B 7/16; G02B 7/18; G02B 21/0064; G02F 1/133514; G02F 1/133509; G03F 7/0007
See application file for complete search history.

(56) References Cited

U.S. PATENT DOCUMENTS

| | | | | |
|---|---|---|---|---|
| 5,633,752 A * | 5/1997 | Tsuchiya et al. | ............... | 359/390 |
| 5,896,224 A * | 4/1999 | Kapitza | .......................... | 359/389 |
| 6,011,662 A | 1/2000 | Evans | | |
| 6,322,223 B1 * | 11/2001 | Smith et al. | .................... | 359/871 |
| 6,384,992 B1 * | 5/2002 | Weiss | .............................. | 359/819 |
| 6,392,796 B1 * | 5/2002 | Schwab et al. | ................ | 359/380 |
| 6,400,501 B2 * | 6/2002 | Tsuchiya et al. | ............... | 359/380 |
| 6,414,805 B1 * | 7/2002 | Reichman et al. | ............ | 359/889 |
| 6,720,547 B1 | 4/2004 | Rajadhyaksha et al. | | |
| 7,180,689 B2 * | 2/2007 | Shinada | ......................... | 359/826 |
| 2002/0015225 A1 | 2/2002 | Ue | | |
| 2002/0034001 A1 | 3/2002 | Faber | | |

(Continued)

FOREIGN PATENT DOCUMENTS

| | | |
|---|---|---|
| DE | 19924686 | 11/2000 |
| DE | 19926037 | 11/2000 |

(Continued)

*Primary Examiner* — Derek S Chapel
(74) *Attorney, Agent, or Firm* — Hodgson Russ LLP

(57) ABSTRACT

A changing apparatus for a microscope (10) comprises a carrying body (50, 150, 250, 350) supported rotatably around a rotation axis (R), having a first coupling part (52), and at least one optical element (100, 200, 300, 400) having a second coupling part (102) that is couplable to the first coupling part (52) for releasable mounting of the optical element (100, 200, 300, 400) on the carrying body (50, 150, 250, 350). The first coupling part (52) comprises a first mechanical coding structure (56) and the second coupling part (102) comprises a second mechanical coding structure (104) that, in a predetermined installation alignment toward the first coding structure (56), is complementary thereto and, in that installation alignment, is placeable onto the first coding structure (56) perpendicularly to the rotation axis (R) of the carrying body (50, 150, 250, 350).

31 Claims, 10 Drawing Sheets

(56) References Cited

U.S. PATENT DOCUMENTS

2006/0007534 A1    1/2006   Fukuyama et al.
2008/0043324 A1    2/2008   Lytle et al.

FOREIGN PATENT DOCUMENTS

| | | |
|---|---|---|
| DE | 19936497 | 4/2001 |
| DE | 20205080 | 6/2002 |
| DE | 10152609 | 5/2003 |
| DE | 10309138 | 9/2004 |
| DE | 102004059778 | 8/2005 |
| DE | 102004034845 | 2/2006 |
| DE | 102004042913 | 3/2006 |
| DE | 102005043103 | 3/2007 |
| WO | 2004031825 | 4/2004 |
| WO | 2011098557 A1 | 8/2011 |

* cited by examiner

CHANGING APPARATUS FOR A MICROSCOPE

CROSS REFERENCE TO RELATED APPLICATIONS

This application claims priority of German patent application number 10 2011 051 949.1 filed Jul. 19, 2011, the entire disclosure of which is incorporated by reference herein.

FIELD OF THE INVENTION

The invention relates to a changing apparatus for a microscope, comprising a carrying body supported rotatably around a rotation axis, the carrying body having a first coupling part, and at least one optical element having a second coupling part that is couplable to the first coupling part for releasable mounting of the optical element on the carrying body.

BACKGROUND OF THE INVENTION

Changing apparatuses of the kind recited above are used in microscopes as retainers for selectable attachment of optical elements, e.g. fluorescence filter blocks. Reference is made in this connection, by way of example, to DE 199 36 497 A1, which discloses a changing apparatus in which the optical elements to be mounted on a carrying body are each equipped with a dovetail slide that is installed on an abutting surface of the carrying body. Attached in front of the abutting surface, as interacting retainer components, are a peg-shaped bolt and, next to the latter, a compression spring bent away under tension by the bolt. As a result of the tension of the bent compression spring, the latter and the bolt are pressed onto the inner sides of the dovetail slide pushed against the abutting surface.

This previously known changing apparatus is disadvantageous in that the respective optical element, with its dovetail slide, must be clamped onto the spring structure, constituted from the bolt and the compression spring, from the side, i.e. in a direction that is substantially parallel to the abutting surface of the carrying body. For this reason the carrying body must be immobilized, for example by means of a brake provided expressly therefor, in order for the optical elements to be coupled on, so as to prevent an undesired rotary motion of the carrying body that complicates installation. In addition, with the spring structure recited above, the deflection of the compression spring must be precisely adjusted in order to achieve the desired clamping effect in the installed state.

From documents DE 199 24 686 A1 and US 2008/0043324 A1 changing apparatuses are known which respectively include a carrying body, supported rotatably around a rotation axis. An optical element can be releasably mounted on the carrying body.

SUMMARY OF THE INVENTION

The object of the invention is to describe a simply constructed changing apparatus for a microscope that enables secure retention and precise positioning of optical elements, and simple changing of said elements.

The invention achieves this object by way of a changing apparatus for a microscope having the features according to claim 1.

The changing apparatus according to the present invention is notable for the fact that the first coupling part comprises a first mechanical coding structure and the second coupling part comprises a second mechanical coding structure that, in a predetermined installation alignment toward the first coding structure, is embodied in a manner complementary thereto and, in that installation alignment, is placeable onto the first coding structure perpendicularly to the rotation axis of the carrying body.

The invention thus provides, on the coupling parts, mechanical coding structures which are embodied in mutually complementary fashion in such a way that they can be coupled to one another only in a predetermined installation alignment with respect to each other. The coding structures are embodied so that they enable placement of the second coding structure (provided on the optical element) onto the first coding structure (provided on the carrying body) perpendicularly to the rotation axis of the carrying body, i.e. in a radial direction. A "complementary" structure is to be understood in this context as a solid physical configuration that brings about a mutual three-dimensional fit, in the manner of a lock-and-key principle, in the desired installation alignment and in a radial direction perpendicularly to the rotation axis of the carrying body. The complementary coding structures thus produce an interface geometry that ensures unambiguous positioning of the optical element on the carrying body and avoids incorrect installation.

The coding structures allow the user to simply place the optical element in a radial direction onto the carrying body. This considerably simplifies handling of the changing apparatus as compared with the approach known from the existing art, in which the optical element is clamped in place on the carrying body from the side. In particular, it is no longer necessary to immobilize the carrying body, for example, by means of a brake, or secure it with a screw, in order to install the optical element, since installation forces acting rotationally on the carrying body are avoided by placing the optical element radially onto the carrying body. "Installation" of the optical element is therefore understood hereinafter as attachment or placement of the optical element on the carrying body, including in particular without the use of tools.

As a result of the radially complementary coding structures, the optical element is also effectively secured against centrifugal forces that occur upon acceleration or deceleration of the carrying body when it rotates around the rotation axis.

One of the two coding structures comprises at least one first engagement element, e.g. a peg and/or an elongated projection, while the respective other coding structure comprises at least one second engagement element complementary thereto, e.g. a recess and/or a groove, that can be brought into engagement with the first engagement element perpendicularly to the rotation axis of the carrying body. The result of these elements that engage with one another is that the optical element can be installed in simple fashion on the carrying body, and is securely held on it.

Alternatively or in addition to the engagement elements recited above, in a further advantageous embodiment one of the two coding structures comprises at least one first planar abutting element and the respective other coding structure at least one second planar abutting element complementary thereto, which can be brought into abutment with the first abutting element perpendicularly to the rotation axis of the carrying body. Especially when the two coding structures comprise not only elements engaging with one another, such as e.g. a peg and a hole or an elongated projection and a groove, but also abutting elements that are in planar contact, this ensures that on the one hand the coding structures enable simple radial placement of the optical element while avoiding incorrect installation, and on the other hand the optical element is securely held on the carrying body.

The engagement elements that engage into one another in pairs, and/or the abutting elements that abut against one another in pairs, define a three-point support. A three-point support of this kind unequivocally defines, i.e. neither overdetermines nor underdetermines, an installation plane that ensures secure mounting of the optical element on the carrying body.

If grooves are provided as engagement elements, they are preferably embodied rectangularly or triangularly in cross section. Such so-called U- or V-grooves, respectively, ensure reliable coupling of the optical element onto the carrying body. V-grooves in particular, because of their cross-sectional shape tapering to a point, promote self-alignment of the optical element on the carrying body.

In a preferred embodiment, at least two grooves are provided, of which a first groove, preferably rectangular in cross section, extends parallel to the rotation axis of the carrying body, and a second groove, preferably triangular in cross section, extends transversely to the first groove. Thanks to the elements that engage into one another in pairs and are arranged transversely to one another, this embodiment promotes secure retention of the optical element on the carrying body.

The second groove is preferably a groove interrupted by the first groove, while the second projection is embodied as a bar-shaped element that passes through the first projection in a transverse direction. In this embodiment, the two grooves are in a sense arranged crosswise with respect to one another, which further promotes self-aligning mounting of the optical element on the carrying body.

Preferably the first coding structure comprises at least one first connecting element, and the second coding structure comprises at least one second connecting element, which can be detachably brought into mutual contact, i.e. can be coupled, for coupling of the two coding structures. In a preferred embodiment, the connecting elements are each embodied on one of the engagement elements that can be brought into mutual engagement and/or on one of the abutting elements that can be brought into mutual abutment. For example, one of the two connecting elements is embodied on a bottom surface of the groove that is rectangular in cross section, and the other connecting element on a flat end surface, facing toward said bottom surface, of the projection engaging into the groove. This ensures particularly secure retention of the optical element on the carrying body.

The first connecting element and the second connecting preferably encompass magnetically attractive elements. For example, a magnet is mounted on the first connecting element, and a ferromagnetic material on the second connecting element. It is also conceivable for both the first connecting element and the second connecting element to encompass mutually attractive magnets, or to be embodied as such. The range of the magnetic attraction force generated between such elements causes the coding elements, brought close to one another upon insertion of the optical element, to be pulled onto one another in self-aligning fashion. This facilitates installation of the optical element on the changing apparatus. Various combinations of magnetically effective elements, i.e. magnets, magnetized or magnetizable elements, are conceivable as connecting elements. For example, permanent magnets and/or elements made of ferrimagnetic or ferromagnetic materials can be used. Electromagnets can also be utilized as connecting elements.

In an advantageous embodiment, the two abutting elements that can be brought into mutual abutment are each formed from two surfaces arranged at an angle, preferably a right angle, to one another. If one of these surfaces is aligned horizontally in the installation state, it can then serve as a support surface on which the abutting element associated with it rests as a result of gravity. A support surface of this kind can be embodied, for example, at the lower end of the carrying body.

In a particularly preferred embodiment, the mutually magnetically attractive elements of the coding structures connected to one another are arranged with an offset from one another, and thereby generate a magnetic attraction force that has two force components which each bring about a magnetic attraction between those surfaces of the abutting elements which are brought into mutual abutment. For example, if one of the abutting elements rests on a horizontally arranged support surface, it is then possible, by means of magnetically effective connecting elements offset vertically from each other, to generate an obliquely downwardly directed attraction force that has a horizontal force component and a force component directed vertically downward. The vertically aligned surfaces are then pressed onto one another by the horizontal force component, while the force component directed vertically downward, in addition to gravity that acts in any case, presses the surface resting on the horizontal support surface onto the support surface.

Instead of magnetically effective connecting elements, connecting elements of other types, e.g. screws, pegs, springs, or the like, can also be used as force-generating means. In a preferred embodiment, for example, the first or the second connecting element encompasses a spring clamp, and the respective other connecting element comprises a latching element that latches into the spring clamp. The spring force acts on the support surfaces of the two abutting elements pressing against one another, and thereby ensures self-aligning contact of the abutting elements against the support surfaces, and thus secure retention of the optical element on the changing apparatus.

Be it noted that the engagement elements, abutting elements, and connecting elements described above can be used in any combinations, provided assurance is given that coding structures constituted by these elements interact in the manner according to the present invention in order to bring about radial coupling while avoiding incorrect installation, and secure retention of the optical element on the carrying body. The engagement elements, abutting elements, and connecting elements can also be distributed arbitrarily on the carrying body and on the optical element, provided interaction thereof according to the present invention is ensured. In one specific embodiment, for example, a groove can be embodied on the carrying body and a projection, engaging into the groove, can be embodied on the optical element, while in an alternative embodiment the corresponding groove is arranged on the optical element and the projection on the carrying body.

By preference, the at least one optical element encompasses multiple optical elements each having the second coupling part, and the carrying body encompasses multiple first coupling parts that are each associated with one of the second coupling parts. In this case the carrying body can be populated with multiple optical elements and can be rotated as necessary in the microscope so that one of said optical elements is selectably put into operation. The optical elements can be, for example, fluorescence filter blocks that each contain an excitation filter, a beam splitter, and a blocking filter; the changing apparatus can thus advantageously be used in fluorescence microscopy for alternative selection of a fluorescence region associated with the filter set.

The carrying body is preferably a turret that is rotationally symmetrical around its rotation axis. In this case the coupling parts arranged on the turret, and also the coupling parts associated with them that are provided on the optical elements, are preferably each of identical design. Each of the optical elements can thus be connected to each of the coupling parts embodied on the turret.

The invention further provides a microscope having a changing apparatus of the kind described above.

BRIEF DESCRIPTION OF THE DRAWING VIEWS

The invention will be described below in further detail with reference to the Figures, in which:

FIG. 1 schematically depicts a fluorescence microscope in which a changing apparatus corresponding to the invention is arranged;

FIG. 4 is a side view of the changing apparatus corresponding to the first exemplifying embodiment, with an optical element fitted on;

DETAILED DESCRIPTION OF THE INVENTION

Figure 1:
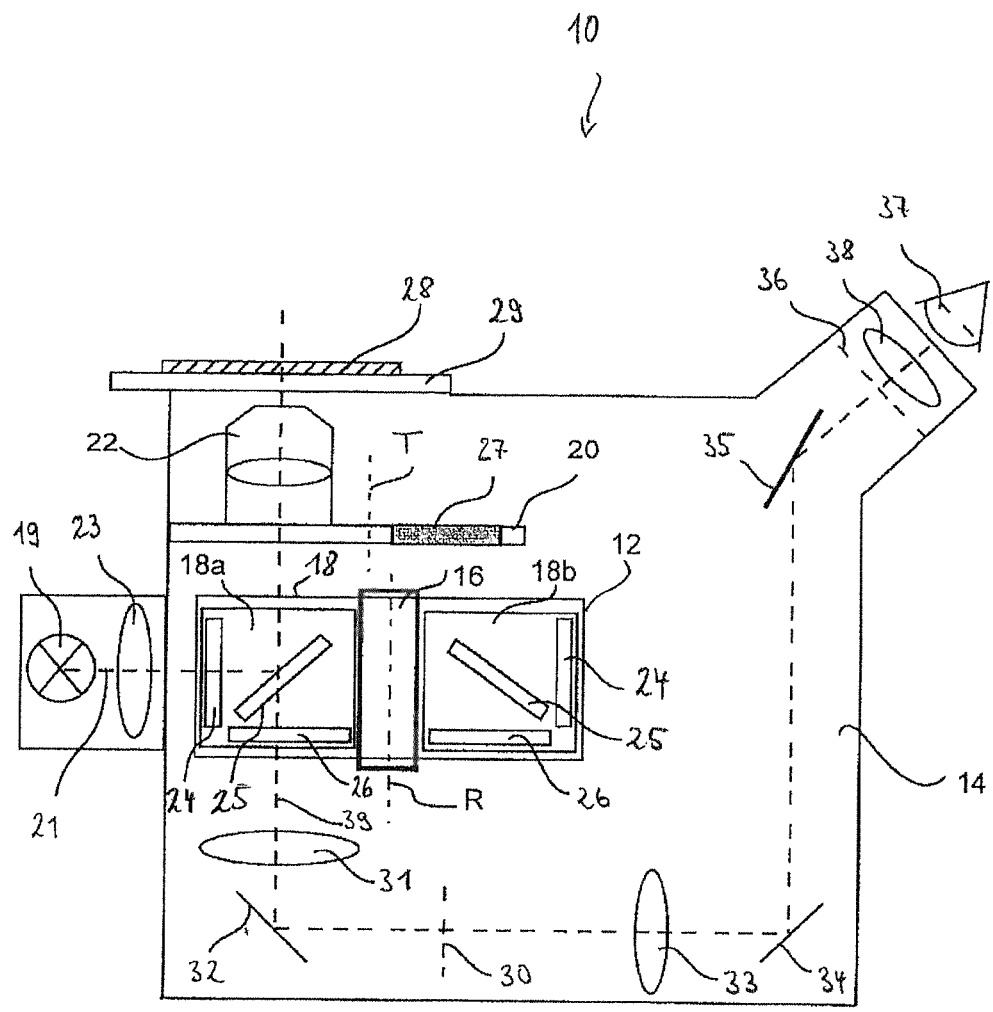

FIG. 1 shows an inverted fluorescence microscope 10 that contains a changing apparatus 12 according to the present invention. The depiction in FIG. 1 is merely schematic, and is intended only to illustrate the arrangement of changing apparatus 12 in fluorescence microscope 10.

Changing apparatus 12 is installed in a stand 14 of fluorescence microscope 10. It encompasses a carrying body 16, hereinafter referred to as a "turret," mounted rotatably around a rotation axis R. Turret 16 is populated with multiple filter blocks 18, two of which (18a and 18b) are shown in plan view in the depiction according to FIG. 1. Turret 16 and filter blocks 18 are described in detail later on in a variety of embodiments.

Proceeding from a light source 19 is an illumination beam path 21, which travels through an illumination optic 23 and encounters a fluorescence filter block 18 that includes an excitation filter 24, a beam splitter 25 arranged at 45° in the illumination beam path, and a blocking filter 26 (also referred to as an "output filter"). The illumination beam passes through excitation filter 24, and at beam splitter 25 is directed to an objective 22 that is mounted on an objective turret 20. Objective turret 20 is rotatable around a turret rotation axis T and comprises a second, unpopulated position 27 (shaded gray) for a further objective. Illumination beam path 21 illuminates a sample 28 that is arranged on a microscope stage 29.

Changing apparatus 12 serves to pivot one of the filter blocks (18a, 18b) selectably into illumination beam path 21.

Objective 22 images sample 28 onto a first intermediate image plane 30. For this, an imaging beam path 39 passes through objective 22, beam splitter 25, blocking filter 26, and a tube lens 31, and is directed by a first deflection mirror 32 onto first intermediate image plane 30. The intermediate image is imaged with a transportation optic 33, which generates no further magnification, via a second deflection mirror 34 and a third deflection mirror 35 onto a second intermediate image plane 36. The intermediate image can be viewed by a user 37 with an eyepiece 38. Alternatively, the intermediate image can be directed onto a camera (not shown).

Figure 2:
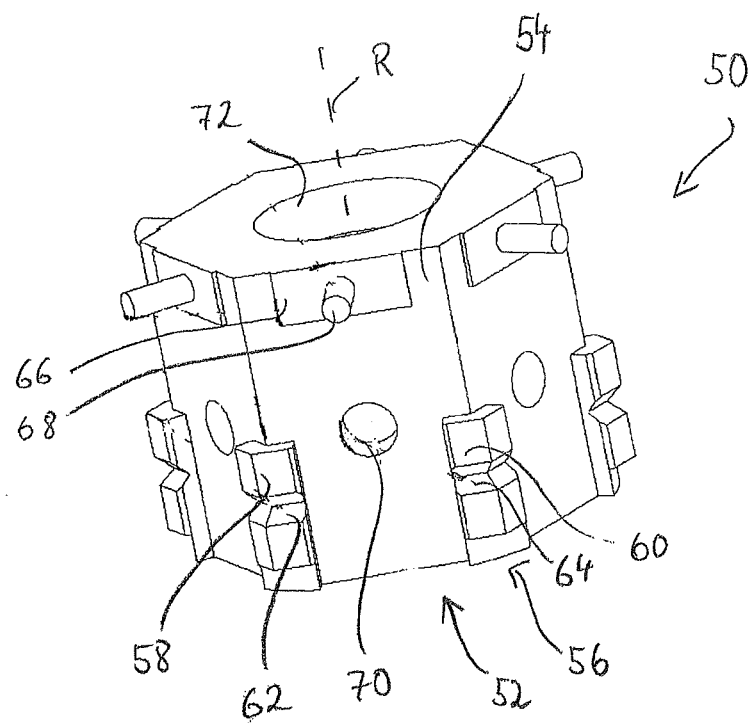
FIG. 2 is a perspective view of a turret that is part of a changing apparatus corresponding to the first exemplifying embodiment.
Figure 3:
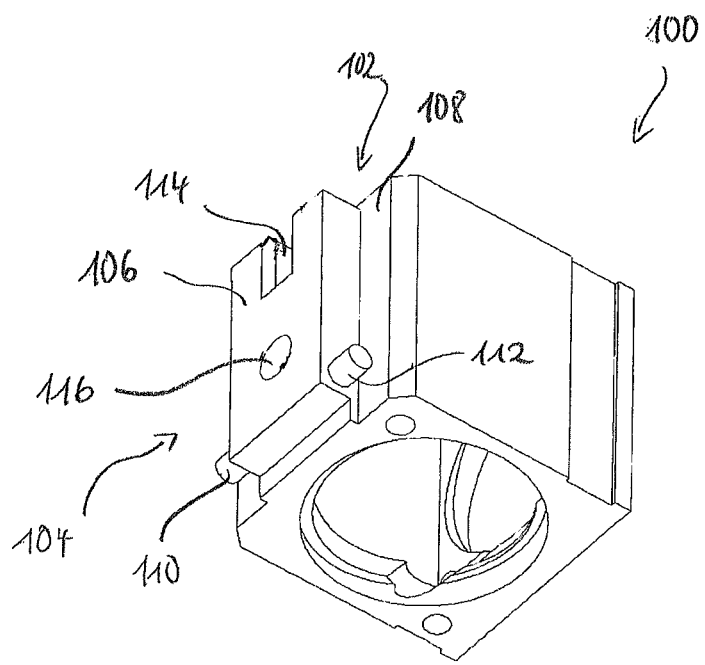
FIG. 3 is a schematic view of a fluorescence filter block that is part of the changing apparatus corresponding to the first exemplifying embodiment.
Figure 4:
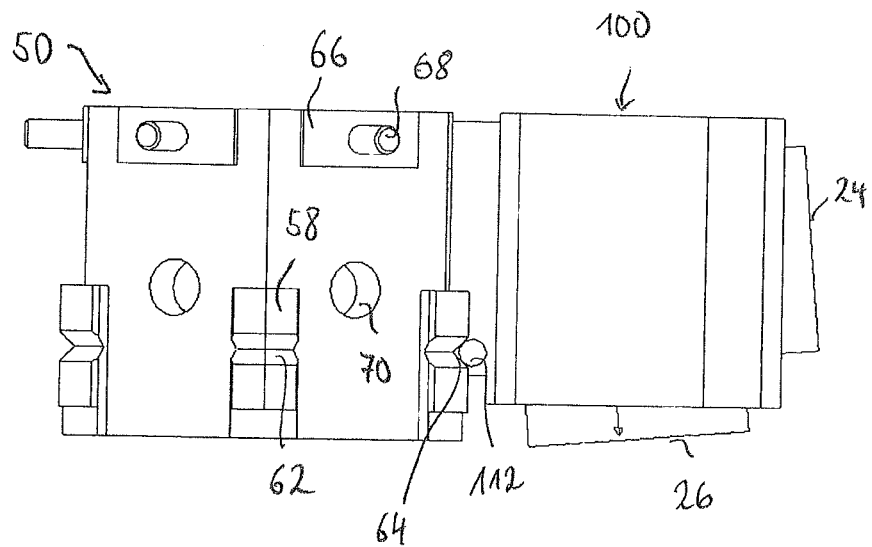
Figure 5:
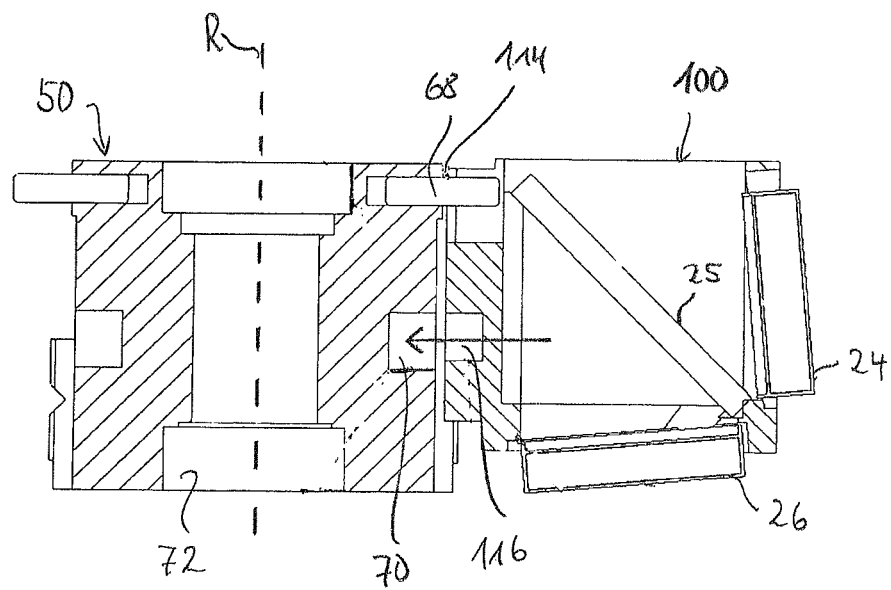
FIG. 5 is a sectioned view of the changing apparatus according to a first exemplifying embodiment, in the installed state.

FIGS. 2 to 5 show a changing apparatus according to a first exemplifying embodiment. FIGS. 2 and 3 depict the individual components of the changing apparatus, while FIGS. 4 and 5 show the changing apparatus in the installed state.

The changing apparatus according to a first exemplifying embodiment encompasses a turret 50, depicted in FIG. 2, that can be populated with six filter blocks, one of which is depicted by way of example, and labeled 100, in FIG. 3.

Turret 50 comprises six coupling parts 52 of identical design, onto each of which filter block 100 (or other filter blocks of identical design in terms of coupling) can be mounted. The respective coupling part 52 is embodied on lateral surface 54 of turret 50.

Coupling part 52 of turret 50 comprises a first mechanical coding structure that is labeled in general as 56 in FIG. 2. This first mechanical coding structure 56 has, in the lower half of the coupling part of lateral surface 54, two groove bases 58 and 60, in each of which is embodied a V-shaped groove 62 and 64. Grooves 62 and 64 are oriented in alignment with one another. They can thus also be construed as a single but interrupted groove. Configured at the upper end of lateral surface 54 is a support surface 66 out of which protrudes a peg 68. A first circular magnet 70 is located approximately at the center of lateral surface 54.

As may best be gathered from the depiction according to FIG. 5, turret 50 is penetrated by a bearing bore 72, embodied in stepped fashion, which serves to support turret 50 rotatably on rotation axis R (indicated merely schematically in the Figures).

Filter block 100, shown in isolation in FIG. 3, has a coupling part 102 associated with coupling part 52 of turret 50. Said part 102 comprises a second mechanical coding structure, embodied in complementary fashion to first coding structure 56 of turret 50, labeled in general as 104 in FIG. 3. This complementary coding structure 104 is formed in turn from a cuboidal elevation 106 that protrudes from an end surface 108. Elevation 106 has at its lower end two laterally protruding projections 110, 112, and at its upper end a rectangular recess 114. A second circular magnet 116 is located approximately at the center of elevation 106.

Coding structures 56 and 104 are adapted to one another in such a way that filter block 100 can be placed with its coupling part 102, in a radial direction perpendicular to rotation axis R, onto coupling part 52 of turret 50. When filter block 100 is installed on turret 50 in this fashion, i.e. without the use of tools, projection 112 then comes into engagement with groove 62, projection 110 comes into engagement with groove 64, the upper part of the end face 108 of elevation 106 comes into abutment with abutting surface 66, and recess 114 comes into engagement with peg 68. In addition, the two magnets 70 and 116 come into abutment with one another and generate a magnetic attraction force by which filter block 34 is held fixedly on turret 50. As indicated by an arrow in FIG. 5, this attractive force acts in a radial direction perpendicular to rotation axis R.

Engagement elements 62, 64, and 68 embodied on turret 50 form, in interaction with engagement elements 110, 112, 114 embodied on filter block 100, a three-point support that ensures secure locking of filter block 100 on turret 50. The attraction force generated by the two magnets 70 and 116 furthermore, upon coupling of filter block 100 onto turret 50, promotes self-alignment of the mutually associated complementary coding structures 56 and 104. Readjustment and, in particular, the use of tools are superfluous, since filter block 100 is brought into the optimal position merely by being put in place.

It is evident from the sectional view according to FIG. 5, as a supplement to the depictions according to FIGS. 2 to 4, that in the present exemplifying embodiment filter block 100 comprises excitation filter 24, blocking filter 26, and beam splitter 25.

Figure 6:
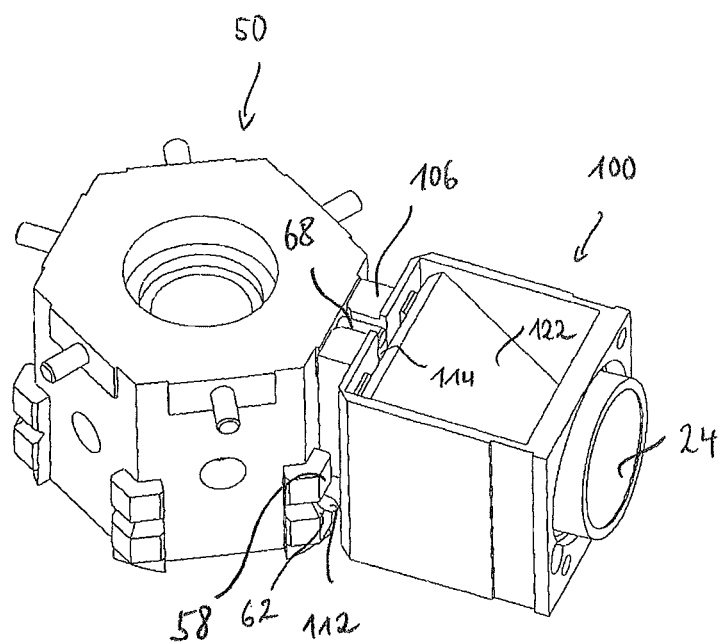
FIG. 6 is a perspective view of the changing apparatus according to a first exemplifying embodiment, in the installed state.

FIGS. 4 to 6 depict the changing apparatus according to a first exemplifying embodiment in the installed state, FIG. 4 being a side view and FIG. 5 a sectioned view. As is apparent in particular from FIGS. 4 and 5, in the installed state filter block 100 is placed radially onto turret 50.

Further exemplifying embodiments of the changing apparatus according to the present invention will be described below with reference to FIGS. 7 to 16. These embodiments differ from the first exemplifying embodiment depicted in FIGS. 2 to 6 in terms of individual elements of the mutually associated, complementary coding structures. In FIGS. 7 to 16 as well, the latter are designated in general throughout as 56 and 104, respectively. In addition, components that correspond to those of the first exemplifying embodiment are labeled with the reference characters already used in the first exemplifying embodiment. These components are not described again hereinafter.

Figure 7:
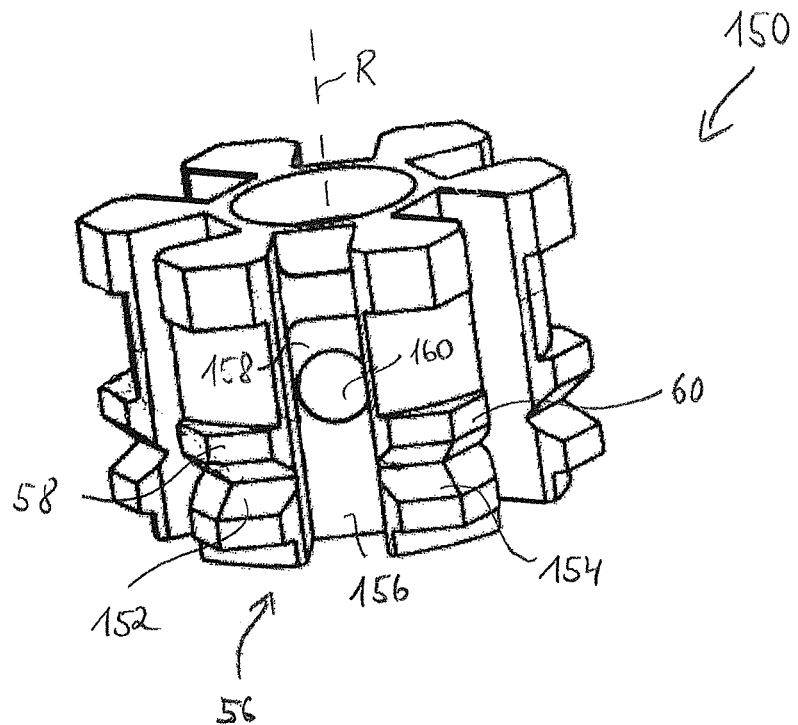
FIG. 7 is a perspective view of a turret that is part of a changing apparatus according to a second exemplifying embodiment.

FIG. 7 shows a turret 150 according to a second exemplifying embodiment, the coding structure 56 of which comprises two V-grooves 152 and 154 that are oriented in alignment with one another in a transverse direction of turret 150. Between grooves 152 and 154, coding structure 56 comprises a U-groove 156 that extends parallel to rotation axis R. V-shaped grooves 152 and 154 thus form, in a sense, one groove interrupted by U-shaped groove 156. A magnet 160 is arranged on a bottom surface 158 of U-shaped groove 156.

Figure 8:
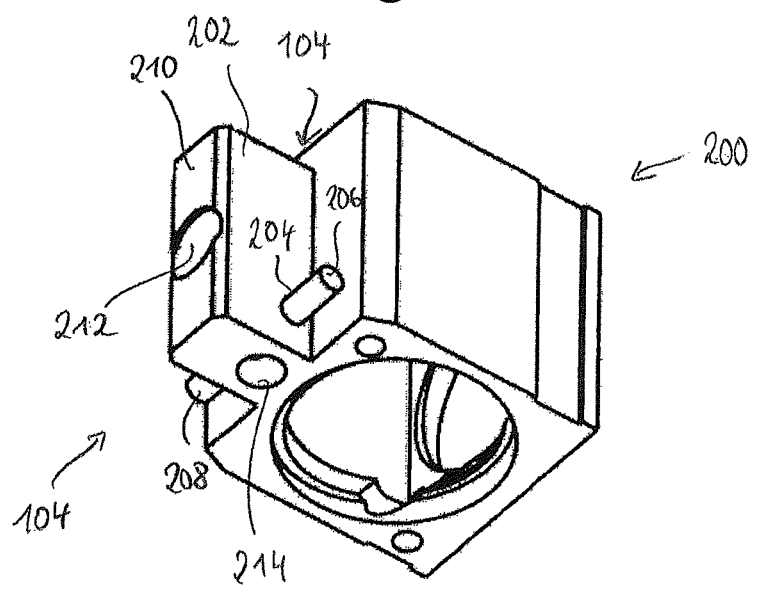
FIG. 8 shows a filter block that is part of the changing apparatus according to a second exemplifying embodiment.

FIG. 8 shows a filter block 200 that is associated with turret 150 depicted in FIG. 7. The mechanical coding structure 104 of filter block 200 comprises a cuboidal lug 202 that engages into U-shaped groove 156 upon coupling of filter block 200 onto turret 150. Lug 202 is penetrated in a transverse direction by a bar 204 whose opposite end segments 206 and 208 are intended for engagement into V-shaped grooves 152 and 154. Lug 202 further comprises at its end surface 210 a magnet 212 that, upon coupling of filter block 200 onto turret 150, comes into abutment with magnet 160 arranged in U-shaped groove 156 and thus ensures secure retention of filter block 200 on turret 150. Embodied on the underside of lug 202 is a threaded bore 214 into which a locking screw (not shown in FIG. 8) can be inserted in order to immobilize bar 204 on lug 202.

In the exemplifying embodiment depicted in FIGS. 7 and 8, engagement elements 152, 154, 206, 208 on the one hand, and engagement elements 156, 202 on the other hand, are arranged crosswise with respect to one another. The result is that filter block 200 is held particularly securely on turret 150.

Figure 9:
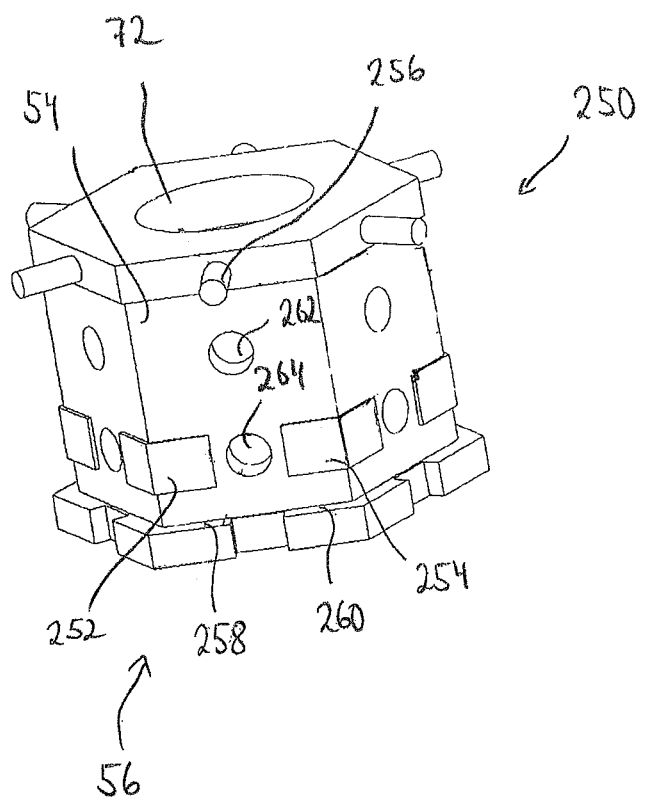
FIG. 9 shows a turret that is part of a changing apparatus according to a third exemplifying embodiment.

FIGS. 9 to 12 show a changing apparatus according to a third exemplifying embodiment. FIG. 9 depicts a turret 250 whose mechanical coding structure 56 encompasses two abutting surfaces 252, 254 as well as a peg 256. Coding structure 56 further comprises, at the lower end of turret 250, two support surfaces 258 and 260 protruding horizontally from lateral surface 54. Two magnets 262 and 264, offset vertically from one another, are furthermore arranged on lateral surface 54.

Figure 10:
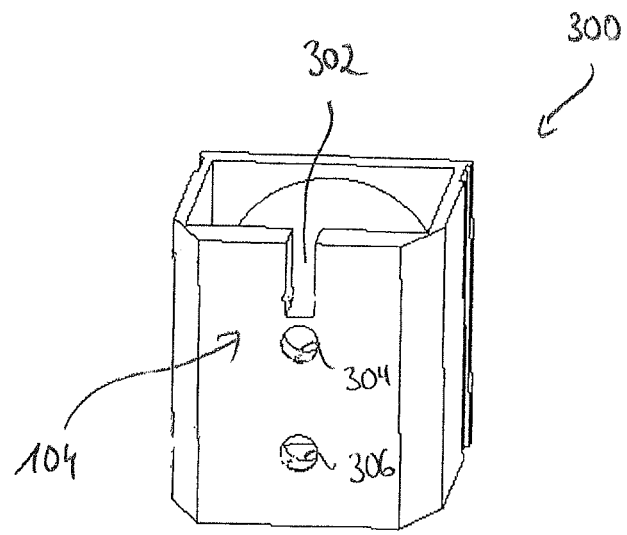
FIG. 10 shows a filter block that is part of the changing apparatus according to a third exemplifying embodiment.
Figure 11:
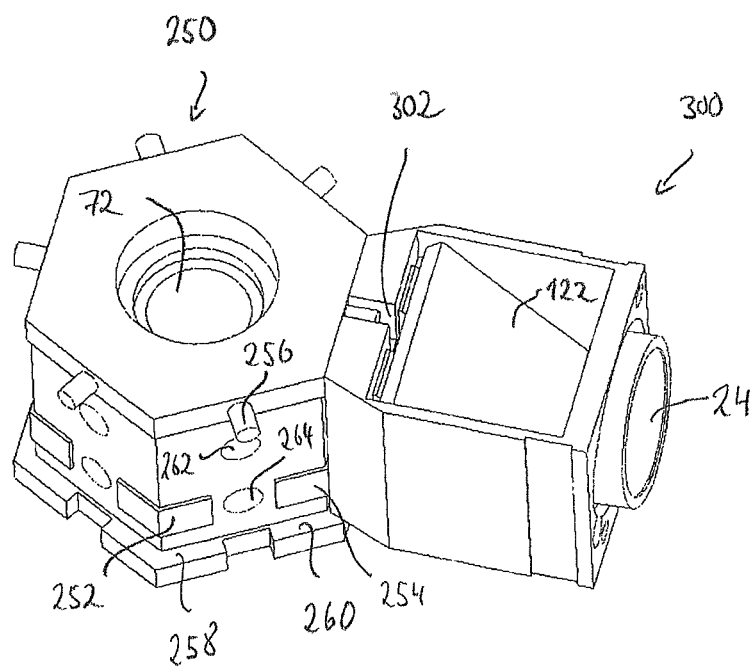
FIG. 11 is a perspective view of the changing apparatus according to a third exemplifying embodiment, in the installed state.

FIG. 10 shows a filter block 300 that is intended for coupling onto turret 250. The mechanical coding structure 104 of filter block 300 provides an elongated, vertically extending recess 302 that is open toward the upper end of filter block 300. Coding structure 104 furthermore comprises magnets 304 and 306 offset vertically from one another.

Upon coupling of filter block 300 onto turret 250, peg 256 comes into engagement with recess 302. In addition, abutting surfaces 252 and 254, which are embodied on lateral surface 54 of turret, come into abutment with parts of the end face, facing toward side wall 54, of filter block 300.

Figure 12:
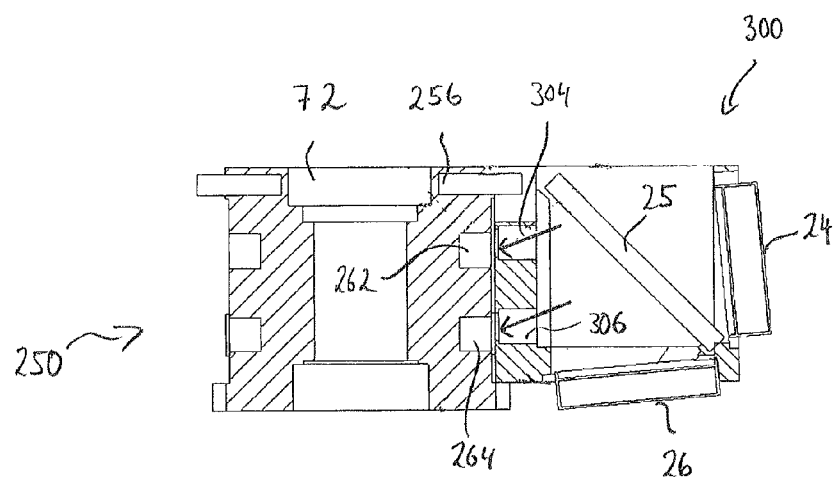
FIG. 12 is a sectioned view of the changing apparatus according to a third exemplifying embodiment.
Figure 13:
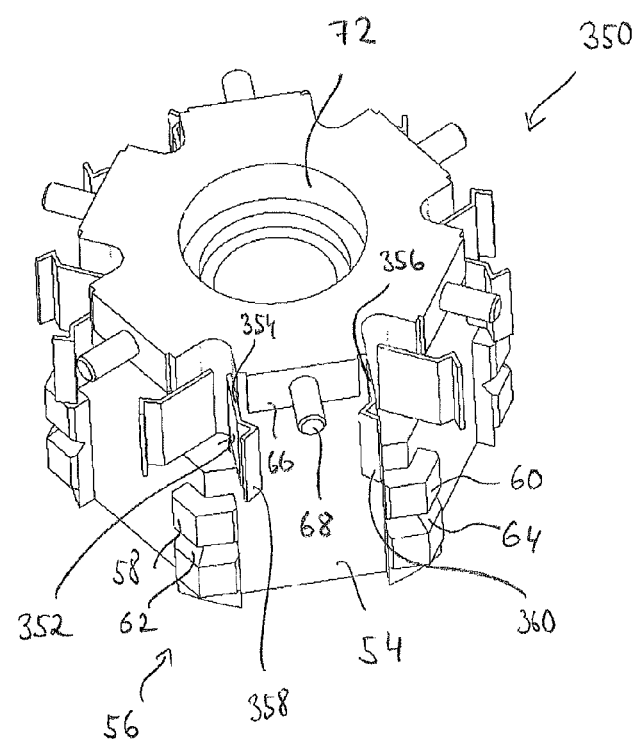
FIG. 13 is a perspective view of a turret that is part of a changing apparatus according to a fourth exemplifying embodiment.

As may be gathered from the depiction according to FIG. 12, magnets 262, 304 and 264, 306 that are associated with one another in pairs are each arranged with a vertical offset from one another. Each pair of magnets 262, 304 and 264, 306 thus generates a magnetic attraction force that comprises both a horizontally acting force component and a force component acting vertically downward. This is indicated in FIG. 12 by the arrow pointing obliquely downward. The result of the force components directed vertical downward is that those parts of filter block 250 which are supported on support surfaces 258 and 260 of turret 250 are pressed against support surfaces 258 and 260. The horizontally directed force components, on the other hand, ensure that those parts of filter block 300 that abut against abutting surfaces 252 and 254 are pushed against abutting surfaces 252 and 254. Lastly, the horizontally directed components also ensure secure engagement of peg 256 into recess 302.

FIGS. 13 to 16 show a fourth exemplifying embodiment of the changing apparatus according to the present invention. This changing apparatus encompasses a turret 350, shown in isolation in FIG. 13, that differs from turret 50 according to the first exemplifying embodiment, depicted in FIG. 2, substantially only in that at its upper end it comprises, instead of magnet 70 provided therein, a spring clamp 352 that is constituted from two clamp elements 354 and 356. The free ends of clamp elements 354 and 356 have mutually facing latching segments 358 and 360 inflected inward in a V-shape.

Figure 14:
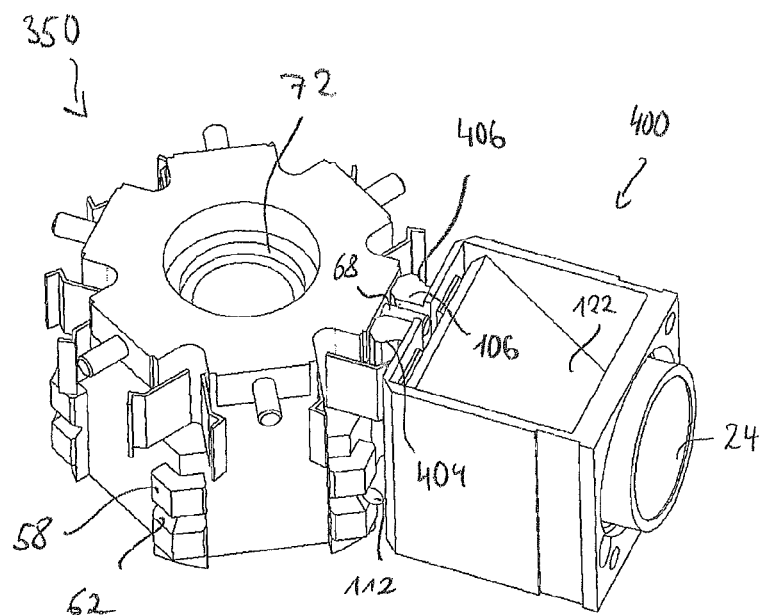
FIG. 14 is a perspective view of the changing apparatus according to a fourth exemplifying embodiment, in the installed state.
Figure 15:
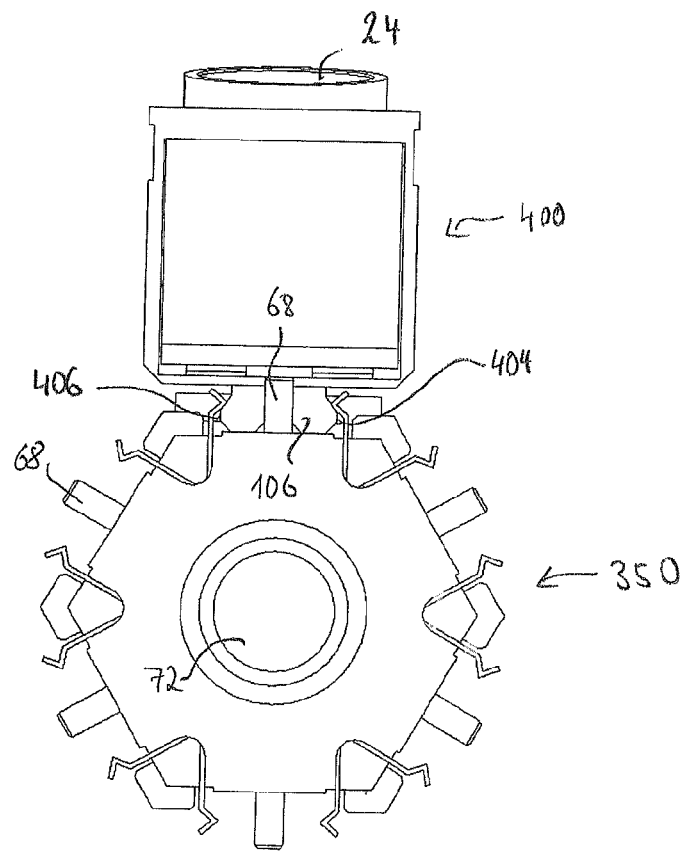
FIG. 15 is a plan view of the changing apparatus according to a fourth embodiment, in the installed state.
Figure 16:
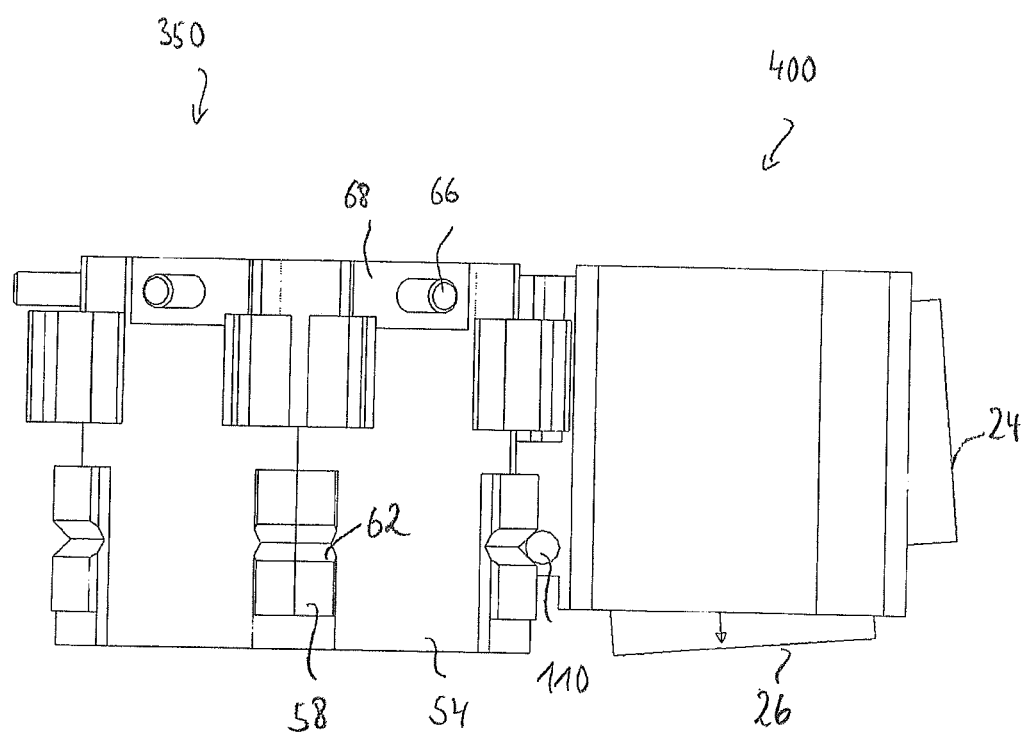
FIG. 16 is a side view of the changing apparatus according to a fourth embodiment, in the installed state.

FIGS. 14 to 16 show the changing apparatus according to a fourth exemplifying embodiment in the installed state. As is apparent therein, a filter block 400 associated with turret 350 differs from filter block 100 according to a first exemplifying embodiment, depicted in FIG. 3, only in that magnet 116 provided therein is replaced by a latching element that is constituted from two projections 404 and 406 that are embodied at the upper end of the cuboidal elevation 106 and protrude to the side. As is most easily gathered from FIG. 15, the latching element constituted by projections 404 and 406 latches into spring clamp 352 upon placement of filter block 400 onto turret 350.

PARTS LIST

- 10 Fluorescence microscope
- 12 Changing apparatus
- 14 Stand
- 16 Turret
- 18, 18a, 18b Filter blocks
- 19 Light source
- 20 Objective turret
- 21 Illumination beam path
- 22 Objective
- 23 Illumination optic
- 24 Excitation filter
- 25 Beam splitter
- 26 Blocking filter
- 30 First intermediate image plane
- 31 Tube lens
- 32 Deflection mirror
- 33 Transportation optic
- 34 Deflection mirror
- 35 Deflection mirror
- 36 Second intermediate image plane
- 37 User
- 38 Eyepiece
- 50 Turret
- 52 Coupling part
- 54 Lateral surface
- 56 First mechanical coding structure
- 58, 60 Groove bases
- 62, 64 V-shaped grooves
- 66 Abutting surface
- 68 Peg
- 70 Magnet
- 100 Filter block
- 102 Coupling part
- 104 Second mechanical coding structure
- 106 Elevation
- 108 End surface
- 110, 112 Projections
- 114 Recess
- 116 Magnet
- 150 Turret
- 152, 154 V-shaped grooves
- 156 U-shaped groove
- 158 Bottom surface
- 160 Magnet
- 200 Filter block
- 202 Lug
- 204 Bar
- 206, 208 End segments
- 210 End surface
- 212 Magnet
- 214 Threaded bore
- 250 Turret
- 252, 254 Abutting surfaces
- 256 Peg
- 258, 260 Support surfaces
- 263, 264 Magnets
- 300 Filter block
- 302 Recess
- 304, 306 Magnets
- 350 Turret
- 352 Spring clamp
- 354, 356 Clamp elements
- 358, 360 Latching segments
- 400 Filter block
- 404, 406 Projections

What is claimed is:

1. A changing apparatus for a microscope, the changing apparatus comprising:
   a carrying body supported rotatably around a rotation axis, the carrying body having a first coupling part; and
   at least one optical element having a second coupling part couplable to the first coupling part for releasable mounting of the optical element on the carrying body;
   wherein the first coupling part comprises a first mechanical coding structure and the second coupling part comprises a second mechanical coding structure;
   wherein the second coding structure is complementary to the first coding structure and placeable onto the first coding structure perpendicularly to the rotation axis of the carrying body when the second coding structure is in a predetermined installation alignment toward the first coding structure;
   wherein one of the first and second coding structures comprises a plurality of first elements and the other of the first and second coding structures comprises a plurality of second elements movable perpendicularly to the rotation axis of the carrying body into respective engagement or abutting alignment with the plurality of first elements to thereby define a three-point support for mounting the optical element on the carrying body;
   wherein the plurality of first elements includes at least one groove, wherein the groove is rectangular or triangular in cross section;
   wherein the at least one groove comprises a first groove extending parallel to the rotation axis of the carrying body and a second groove extending transversely to the first groove, and wherein the plurality of second elements includes a first projection that engages into the first groove and a second projection that engages into the second groove; and
   wherein the second groove is interrupted by the first groove, and the second projection is a bar-shaped element that passes through the first projection in a transverse direction.

2. The changing apparatus according to claim 1, wherein one of the first and second coding structures comprises at least one first abutting element having a planar surface and the other of the first and second coding structures comprises at least one second abutting element having a planar surface, wherein the second abutting element is movable perpendicularly to the rotation axis of the carrying body to bring the planar surface of the second abutting element into abutment with the planar surface of the first abutting element.

3. The changing apparatus according to claim 2, wherein the plurality of first elements comprises a force-generating means that presses the planar surfaces of the first and second abutting elements against one another.

4. The changing apparatus according to claim 2, wherein each of the first and second abutting elements includes two surfaces arranged at an angle to one another, wherein the planar surface of the respective abutting element is one of the two surfaces of the respective abutting element.

5. The changing apparatus according to claim 4, wherein the angle is a right angle.

6. The changing apparatus according to claim 4, wherein the first coding structure includes a first magnetically attractive element and the second coding structure includes a second magnetically attractive element, wherein when the first and second coding structures are connected to one another, the first and second magnetically attractive elements are arranged with an offset from one another and thereby generate a magnetic attraction force that has two directional force components to urge the two surfaces of the second abutting element into respective abutment with the two surfaces of the first abutting element.

7. The changing apparatus according to claim 1, wherein the groove comprises two sub-grooves aligned with one another and arranged at a distance from one another.

8. The changing apparatus according to claim 1, wherein the first groove is rectangular in cross section and the second groove is triangular in cross section.

9. The changing apparatus according to claim 1, wherein the first coding structure comprises at least one first connecting element, and the second coding structure comprises at least one second connecting element, wherein the first and second connecting elements are detachably connected to one another for coupling of the first and second coding structures.

10. The changing device according to claim 9, wherein the first connecting element is one of the plurality of first elements and the second connecting element is one of the plurality of second elements.

11. The changing apparatus according to claim 10, wherein the plurality of first elements includes a first groove extending parallel to the rotation axis of the carrying body and being rectangular in cross section, and a second groove extending transversely to the first groove and being triangular in cross section, and wherein the plurality of second elements includes a first projection that engages into the first groove and a second projection that engages into the second groove, wherein one of the first and second connecting elements is arranged on a bottom surface of the first groove and the other of the first and second connecting elements is arranged on a flat end face of the first projection facing toward said bottom surface of the first groove.

12. The changing apparatus according to claim 9, wherein at least one of the first connecting element and the second connecting element includes a magnetically attractive element.

13. The changing apparatus according to claim 9, wherein one of the first and second connecting elements comprises a spring clamp and the other of the first and second connecting elements comprises a latching element that latches into the spring clamp.

14. The changing apparatus according to claim 1, wherein the optical element is selected from a group consisting of a fluorescence filter block, a neutral filter, a spectral filter, a mirror, and an imaging optical element.

15. The changing apparatus according to claim 1, wherein the at least one optical element comprises a plurality of optical elements each having the second coupling part, and the carrying body comprises a plurality of first coupling parts each associated with one of the second coupling parts.

16. The changing apparatus according to claim 15, wherein the carrying body is a turret that is rotationally symmetrical around the rotation axis thereof.

17. A changing apparatus for a microscope, the changing apparatus comprising:
 a carrying body supported rotatably around a rotation axis, the carrying body having a first coupling part; and
 at least one optical element having a second coupling part couplable to the first coupling part for releasable mounting of the optical element on the carrying body;
 wherein the first coupling part comprises a first mechanical coding structure and the second coupling part comprises a second mechanical coding structure;
 wherein the second coding structure is complementary to the first coding structure and placeable onto the first coding structure perpendicularly to the rotation axis of the carrying body when the second coding structure is in a predetermined installation alignment toward the first coding structure;
 wherein one of the first and second coding structures comprises a plurality of first elements and the other of the first and second coding structures comprises a plurality of second elements movable perpendicularly to the rotation axis of the carrying body into respective engagement or abutting alignment with the plurality of first elements to thereby define a three-point support for mounting the optical element on the carrying body;
 wherein one of the first and second coding structures comprises at least one first abutting element having a planar surface and the other of the first and second coding structures comprises at least one second abutting element having a planar surface, wherein the second abutting element is movable perpendicularly to the rotation axis of the carrying body to bring the planar surface of the second abutting element into abutment with the planar surface of the first abutting element;
 wherein each of the first and second abutting elements includes two surfaces arranged at an angle to one another, wherein the planar surface of the respective abutting element is one of the two surfaces of the respective abutting element; and
 wherein the first coding structure includes a first magnetically attractive element and the second coding structure includes a second magnetically attractive element, wherein when the first and second coding structures are connected to one another, the first and second magnetically attractive elements are arranged with an offset from one another and thereby generate a magnetic attraction force that has two directional force components to urge the two surfaces of the second abutting element into respective abutment with the two surfaces of the first abutting element.

18. The changing apparatus according to claim 17, wherein the plurality of first elements comprises a force-generating means that presses the planar surfaces of the first and second abutting elements against one another.

19. The changing apparatus according to claim 17, wherein the angle is a right angle.

20. The changing apparatus according to claim 17, wherein the plurality of first elements includes at least one groove, wherein the groove is rectangular or triangular in cross section.

21. The changing apparatus according to claim 20, wherein the groove comprises two sub-grooves aligned with one another and arranged at a distance from one another.

22. The changing apparatus according to claim 20, wherein the at least one groove comprises a first groove extending parallel to the rotation axis of the carrying body and a second groove extending transversely to the first groove, and wherein the plurality of second elements includes a first projection that engages into the first groove and a second projection that engages into the second groove.

23. The changing apparatus according to claim 22, wherein the first groove is rectangular in cross section and the second groove is triangular in cross section.

24. The changing apparatus according to claim 17, wherein the first coding structure comprises at least one first connecting element, and the second coding structure comprises at least one second connecting element, wherein the first and second connecting elements are detachably connected to one another for coupling of the first and second coding structures.

25. The changing device according to claim 24, wherein the first connecting element is one of the plurality of first elements and the second connecting element is one of the plurality of second elements.

26. The changing apparatus according to claim 25, wherein the plurality of first elements includes a first groove extending parallel to the rotation axis of the carrying body and being rectangular in cross section, and a second groove extending transversely to the first groove and being triangular in cross section, and wherein the plurality of second elements includes a first projection that engages into the first groove and a second projection that engages into the second groove, wherein one of the first and second connecting elements is arranged on a bottom surface of the first groove and the other of the first and second connecting elements is arranged on a flat end face of the first projection facing toward said bottom surface of the first groove.

27. The changing apparatus according to claim 24, wherein at least one of the first connecting element and the second connecting element includes a magnetically attractive element.

28. The changing apparatus according to claim 24, wherein one of the first and second connecting elements comprises a spring clamp and the other of the first and second connecting elements comprises a latching element that latches into the spring clamp.

29. The changing apparatus according to claim 17, wherein the optical element is selected from a group consisting of a fluorescence filter block, a neutral filter, a spectral filter, a mirror, and an imaging optical element.

30. The changing apparatus according to claim 17, wherein the at least one optical element comprises a plurality of optical elements each having the second coupling part, and the carrying body comprises a plurality of first coupling parts each associated with one of the second coupling parts.

31. The changing apparatus according to claim 30, wherein the carrying body is a turret that is rotationally symmetrical around the rotation axis thereof.

* * * * *